United States Patent [19]

Miyawaki

[11] Patent Number: 4,831,898
[45] Date of Patent: May 23, 1989

[54] TRANSMISSION RATIO CONTROL SYSTEM FOR A CONTINUOUSLY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 94,681

[22] Filed: Sep. 4, 1987

[30] Foreign Application Priority Data

Sep. 10, 1986 [JP] Japan .................. 61-213420

[51] Int. Cl.$^4$ ............................................ B60K 41/14
[52] U.S. Cl. ........................................ 74/866; 74/868
[58] Field of Search ................ 74/862, 864, 866, 865, 74/868, 870, 877

[56] References Cited

U.S. PATENT DOCUMENTS

| 4,253,347 | 3/1981 | Mizuno et al. | 74/862 |
|---|---|---|---|
| 4,261,229 | 4/1981 | Mizuno et al. | 74/862 |
| 4,464,952 | 8/1984 | Stubbs | 74/866 |
| 4,509,125 | 4/1985 | Fattic et al. | 74/866 |
| 4,543,855 | 10/1985 | Oetting et al. | 74/865 |
| 4,584,907 | 4/1986 | Niwa et al. | 74/862 |
| 4,622,865 | 11/1986 | Itoh et al. | 74/866 |
| 4,628,773 | 12/1986 | Itoh et al. | 74/867 |
| 4,649,486 | 3/1987 | Oshiage | 74/866 |
| 4,653,007 | 3/1987 | Osanai et al. | 74/866 |
| 4,658,360 | 4/1987 | Osanai et al. | 74/866 |
| 4,671,138 | 6/1987 | Nobumoto et al. | 74/862 |
| 4,682,518 | 7/1987 | Takada et al. | 74/866 |
| 4,683,779 | 8/1987 | Osanai et al. | 74/866 |
| 4,701,853 | 10/1987 | Osanai | 74/866 |
| 4,702,128 | 10/1987 | Oshiage | 74/866 |
| 4,718,012 | 1/1988 | Oshiage | 74/866 |
| 4,730,523 | 3/1988 | Takahashi | 74/877 |
| 4,753,133 | 6/1988 | Itoh et al. | 74/865 |

Primary Examiner—Dwight G. Diehl
Assistant Examiner—Harold F. Macris
Attorney, Agent, or Firm—Martin A. Farber

[57] ABSTRACT

A control system for a continuously variable transmission for a motor vehicle has a transmission ratio control valve having a spool for controlling oil supplied to a cylinder of a drive pulley to change the transmission ratio. The transmission ratio control valve has chambers at both ends of the spool. By controlling flow rate of oil supplied to the chambers in accordance with a desired transmission ratio, the spool is shifted, so that the transmission ratio changing speed is controlled. When an accelerator pedal of the vehicle is rapidly depressed while the transmission ratio is changing, the transmission ratio changing speed is reduced for a predetermined time.

11 Claims, 7 Drawing Sheets

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio when an accelerator pedal of the vehicle is quickly depressed while the transmission ratio is changing.

A known control system for a continuosly variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced at a speed which is decided by line pressure, pressure of oil supplied to the servo device of the drive pulley, and the actual transmission ratio. In such a system, the speed (rate) of changing of the transmission ratio up to a desired transmission ratio can not be controlled in accordance with driving conditions. Accordingly, hunting or overshooting of the transmission ratio occurs, which causes the driveability of the vehicle to reduce.

EP-A-No. 207603 shows a system which operates to vary a desired transmission ratio in accordance with the opening degree of a throttle valve and speed of the driven pulley. The transmission ratio changing speed is controlled so that the actual transmission ratio converges to the desired transmission ratio.

However, the actual transmission ratio does not always comply with the calculated desired ratio. For example, the speed of the convergence depends much on the running condition of the belt engaging with the drive and driven pulleys, that is, on whether the diametrical position of the belt relative to the pulleys is stable at a steady state or changing in the diametrical direction at transient state, for changing the transmission ratio. When the transmission ratio is constant, forces of the drive and driven pulleys exerted on the belt are balanced. In order to change the transmission ratio in accordance with depression or release of the accelerator pedal, oil must be applied to or drained from the servo device of the drive pulley, thereby changing the forces of the pulleys acting on the belt. Thus, the belt moves toward or away from the center of each pulley in the radial direction thereof.

Figure 6:
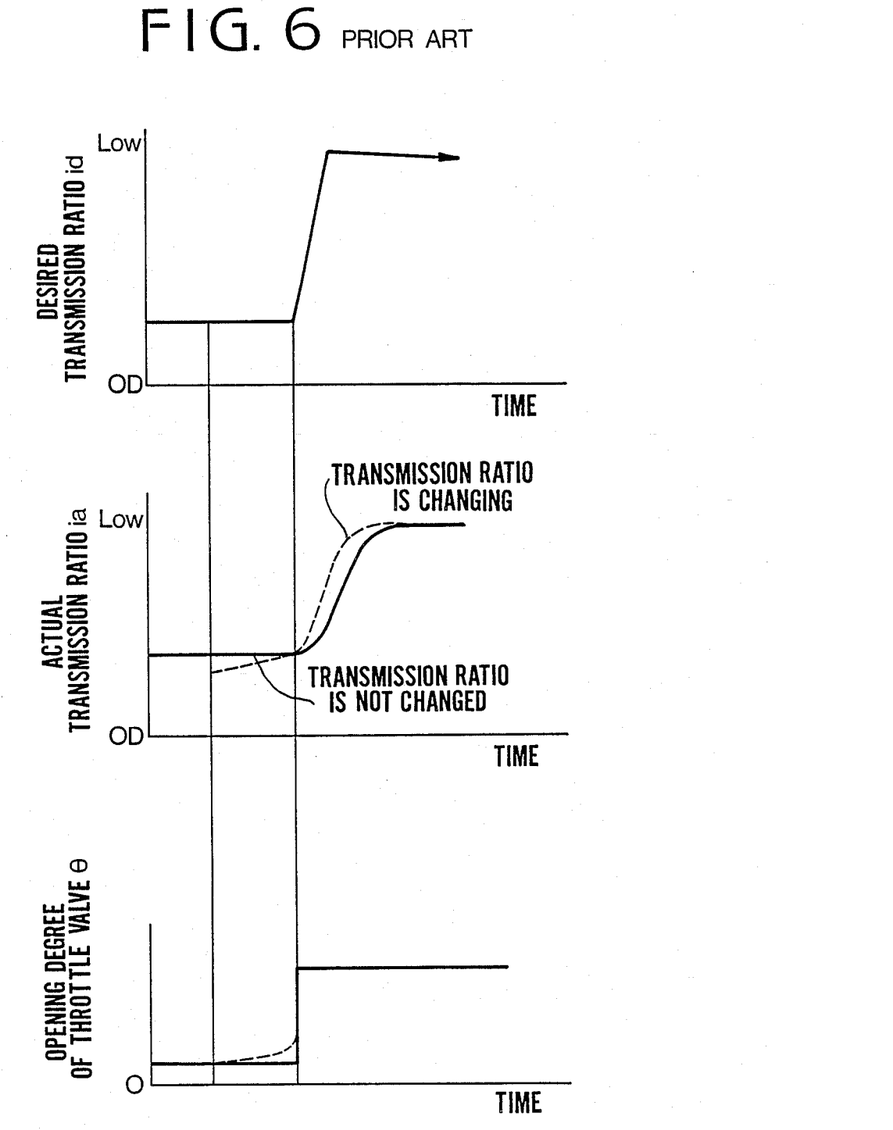
FIG. 6 is a graph showing transmission ratio changing modes in the prior art.

Referring to FIG. 6, when the throttle valve is quickly opened from a steady state, the desired transmission ratio (id) rises quickly as illustrated. However, the actual transmission ratio (ia) changes with a delay after rising of the desired transmission ratio, since the movement of the belt is retarded by the grip of the pulleys.

On the other hand, if the accelerator pedal is quickly depressed while the transmission ratio is changing, and hence the belt is moving, the belt moves fast in the diametrical direction. Accordingly, as shown by the dotted line in FIG. 6, the transmission ratio changes rapidly in accordance with the desired transmission ratio id, which causes a shock due to a large change of torque.

SUMMARY OF THE INVENTION

The object of the present invention is to provide a transmission ratio control system which has delayed response to rapid change of the desired transmission ratio in a transmission ratio changing state, thereby avoiding rapid change of the transmission ratio.

According to the present invention, there is provided a control system for a continuously variable transmission for transmitting the power of an internal combustion engine, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a first hydraulic circuit having a pump for supplying oil to both the hydraulic cylinders, a transmission ratio control valve having a spool for controlling the oil supplied to the cylinder of the drive pulley to change the transmission ratio to a desired transmission ratio.

The system comprises first means for shifting the spool, first detecting means for detecting rapid depression of an accelerator pedal of the vehicle and for producing a rapid depression signal, second detecting means for detecting a fact that the transmission is in a transmission ratio changing state at the production of the rapid depression signal and for producing a transmission ratio changing signal, sensing means for sensing operation conditions of the engine and the transmission and for producing a first signal dependent on the conditions, second means responsive to the first signal for producing an actual transmission ratio signal, third means responsive to the first signal for producing a desired transmission ratio signal, fourth means responsive to the actual transmission ratio signal and to the desired transmission ratio signal for producing a transmission ratio changing speed signal, fifth means responsive to the transmission ratio changing speed signal for producing a control signal for operating the first means to shift the spool at a speed dependent on the transmission ratio changing speed signal to provide a transmission ratio, sixth means responsive to the rapid depression signal and to the actual transmission ratio changing signal for producing a reducing signal, said fourth means being arranged to respond to the reducing signal for reducing the desired transmission ratio changing speed for a predetermined period.

In an aspect of the invention, the sixth means comprises a reducing value calculator for producing a reducing value signal, and a desired transmission ratio correcting section responsive to the reducing value signal for reducing the desired transmission ratio signal for a predetermined period of time.

The other objects and features of this invention will be apparently understood from the following description with reference to the accompanying drawings.

DETAILED DESCRIPTION OF THE PREFERRED EMBODIMENT

Figure 1:
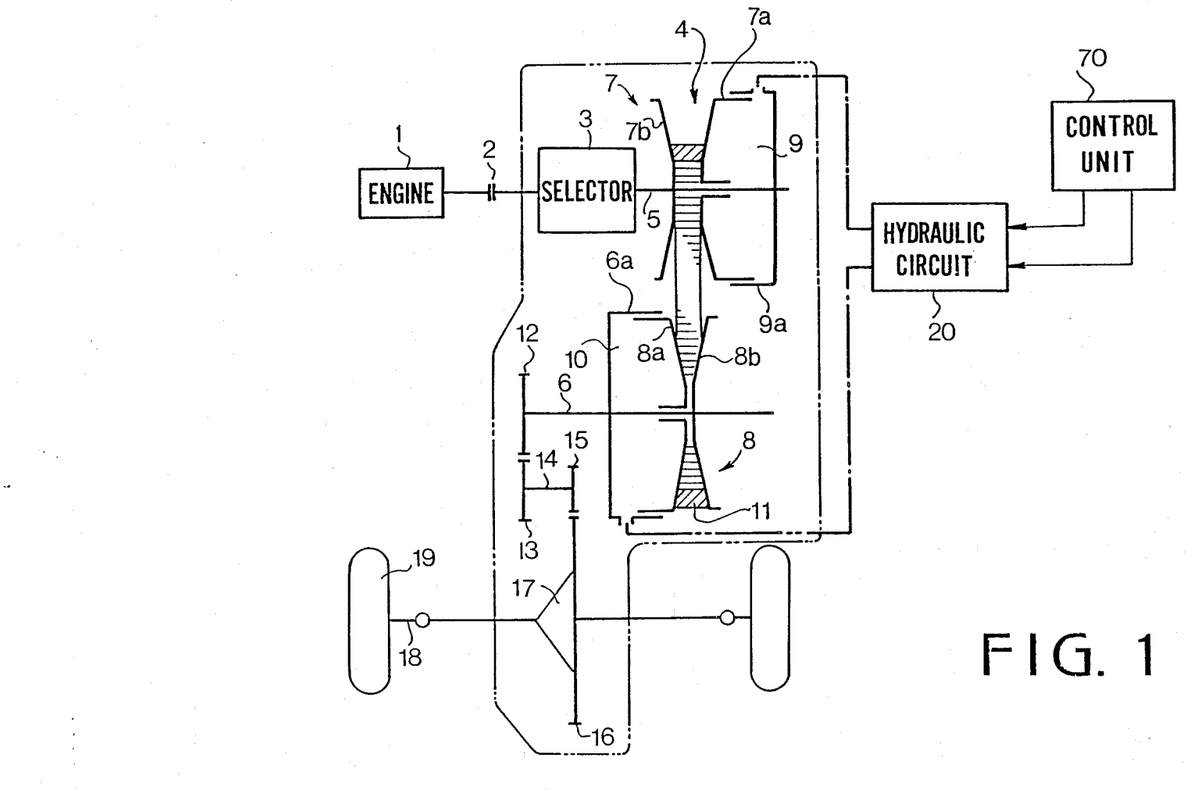
FIG. 1 is a schematic illustration of a continuously variable

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with hydraulic circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
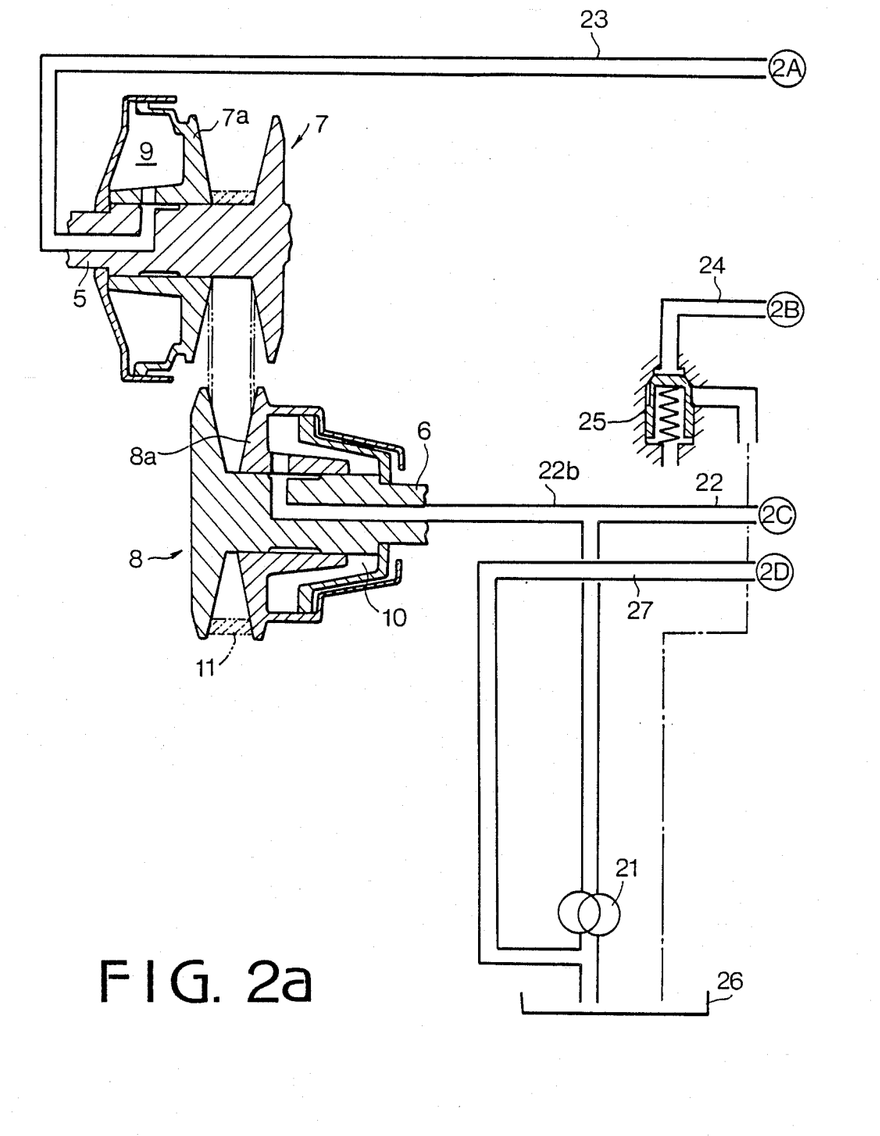
FIGS. 2a and 2b are schematic diagrams showing a control system according to the present invention.
Figure 2B:
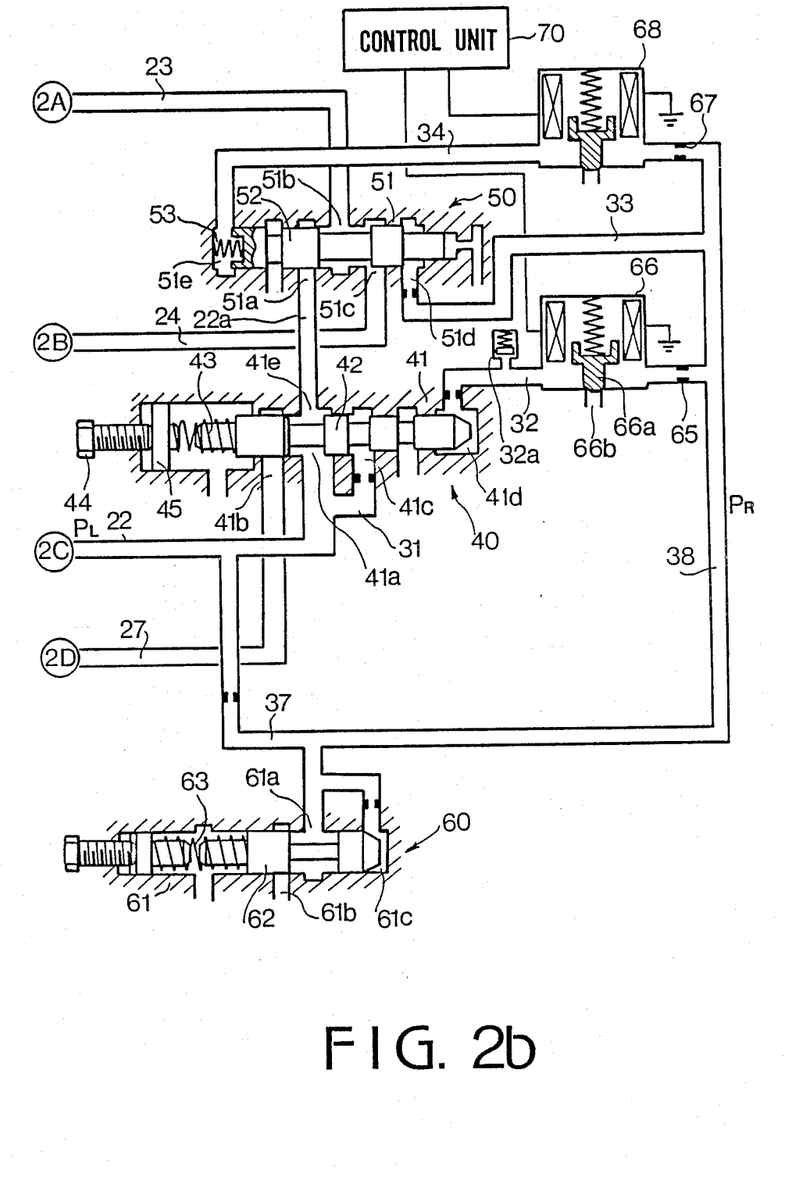

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of the driven pulley 8 is applied with pressurized oil through a passage 22b without passing through valves 40 and 50. The movable conical disc 7a of the drive pulley 7 is so designed that the pressure receiving area thereof is larger than that of the movable conical disc 8a of the driven pulley 8.

The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring and 53 for urging the spool 52 in the downshift direction. A port 51b of the valve body 51 is selectively communicated with a pressure oil supply port 51a or a drain port 51c in accordance with the position of lands of the spool 52. Port 51b communicates with chamber 9 through conduit 23, and port 51a communicates with port 41e of line pressure control valve 40 through conduit 22a. The drain port 51c is communicated reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to the chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of the pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

The duty ratio is decided by the transmission ratio changing speed and the transmission ratio.

When the transmission is upshifted, the duty ratio D is a decreasing function of the actual transmission ratio ia and an increasing function of the transmission ratio changing speed (rate) di/dt. When the transmission is downshifted, the duty ratio D is an increasing function of the actual transmission ratio ia and a decreasing function of the transmission ratio changing speed (rate) di/dt.

In a feedback control system, the transmission ratio changing speed (rate) di/dt can be decided by the difference between the actual transmission ratio ia and a desired transmission ratio id, as follows.
di/dt=K1 (id−ia)
where K1 is a coefficient.

However, the response of the transmission control system including various mechanisms is slow, which means that the convergence of the actual transmission ratio to the desired transmission ratio delays.

In order to eliminate the control delay, the transmission ratio changing speed (rate) di/dt is corrected by the speed of change of the desired transmission ratio (did/dt), as follows.

$$di/dt = K1\ (id-ia) + K2 \cdot did/dt$$

where K2 is a coefficient.

The desired transmission ratio changing speed did/dt is to advance the phase of the control operation. Thus, the response of the system can be improved. In order to decide the upshift or the downshift, the equation is rewritten as follows.

$$di/dt = K1\ \{(id + K2/K1 \cdot did/dt) - ia\ \}$$

The transmission is downshifted when (id+K2/K1·did/dt)>ia, and di/dt>0. The transmission is upshifted when (id+K2/K1·did/dt)<ia, and di/dt<0. The speed did/dt is obtained by the amount (Δid) of change of the desired transmission ratio at a predetermined intervals (Δt), that is Δid/Δt.

The coefficient K1 may be changed in accordance with the opening degree of the throttle valve, and the coefficient K2 may also be changed in accordance with physical conditions of the system, such as viscosity of oil used in the system.

Figure 3:
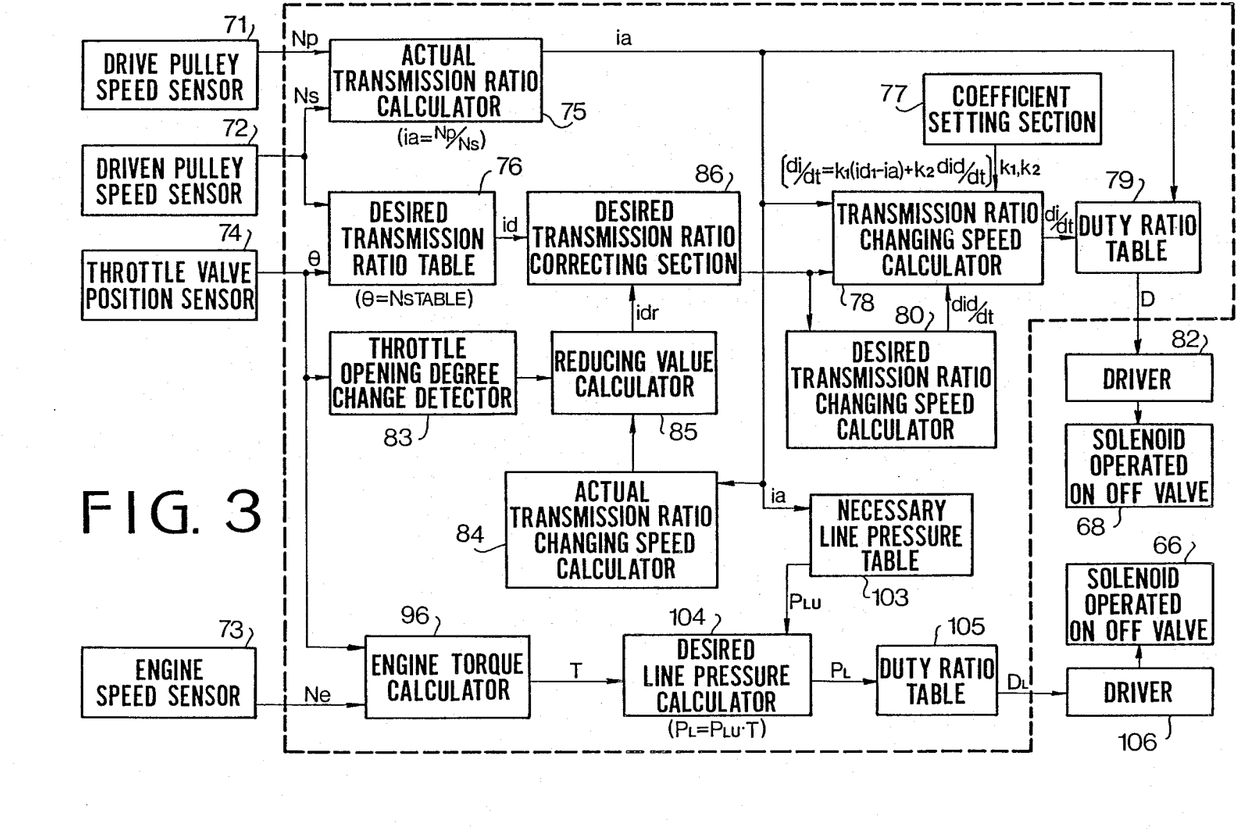
FIG. 3 block diagram showing a control unit.

Referring to FIG. 3, the system is arranged to control the transmission ratio in accordance with the above described principle. In the system, a drive pulley speed sensor 71, driven pulley speed sensor 72, engine speed sensor 73 and throttle valve position sensor (or intake manifold pressure sensor) 74 are provided. Output signals $N_p$ and $N_S$ of sensors 71, 72 are fed to an actual transmission ratio calculator 75 to produce an actual transmission ratio ia in accordance with ia=$N_P/N_S$. Output signal $N_S$ and output signal θ representing the opening degree of the throttle valve position sensor 74 are fed to a desired transmission ratio table 76. The desired transmission ratio id is derived from the table 76 in accordance with signals $N_S$ and θ.

Figure 5A:
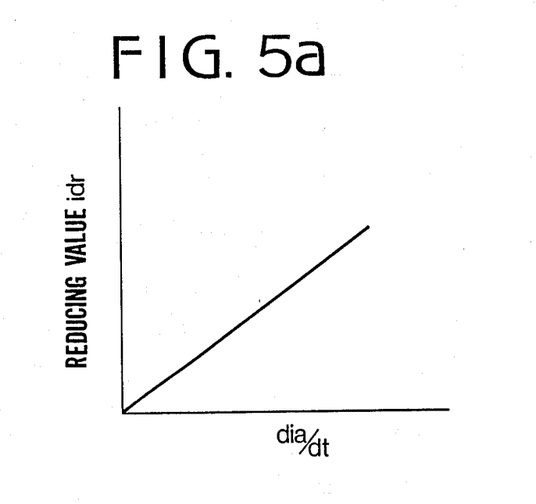
FIG. 5a is, a graph showing a relationship between actual transmission ratio changing speed and reducing value.

The output signal θ is also fed to a throttle opening degree change detector 83 which detects whether there is a change in throttle position or not. The actual transmission ratio ia is fed to an actual transmission ratio changing speed (rate) calculator 84 where actual transmission ratio changing speed (rate) dia/dt is calculated based on change of the actual transmission ratio ia. The output signal of the throttle opening degree change detector 83 and the output dia/dt are applied to a reducing value calculator 85 where a reducing value idr, which is an increasing function of the actual transmission ratio changing speed (rate) dia/dt as shown in FIG. 5a, is calculated. The output idr and the desired transmission ratio id are fed to a desired transmission ratio correcting section 86. In the correcting section 86, the desired transmission ratio id is reduced to a corrected desired ratio $id_1$ ($id_1$=id−idr).

The corrected desired transmission ratio $id_1$ is fed to a desired transmission ratio changing speed calculator 80 which produces a desired transmission ratio changing speed (rate) did/dt. A coefficient setting section 77 produces coefficients K1 and K2. The actual transmission ratio ia, corrected desired transmission ratio $id_1$, desired transmission ratio changing speed (rate) did/dt and coefficients K1 and K2 are applied to a transmission ratio changing speed calculator 78 to produce a transmission ratio changing speed (rate) di/dt from the formula di/dt=K1($id_1$−ia)+K2 ·did/dt.

The speed (rate) di/dt and actual transmission ratio ia are applied to a duty ratio table 79 to derive the duty ratio D. The duty ratio D is supplied to the solenoid operated on-off valve 68 through a driver 82.

Further, the output signal θ of throttle valve position sensor 74 and the output $N_e$ of engine speed sensor 73 are fed to an engine torque calculator 96, so that engine torque T is calculated based on throttle valve position θ and engine speed $N_e$.

On the other hand, the actual transmission ratio ia from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In operation, while the vehicle is at a stop, chamber 10 of the driven pulley 8 is supplied with line pressure through passage 22b, and the chamber 9 of the drive pulley 7 is drained, since $N_P$, $N_S$, θ and duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration of the vehicle, the desired transmission ratio changing speed (rate) did/dt and transmission ratio changing speed (rate) di/dt are calculated at calculators 80 and 78. The transmission ratio changing speed di/dt is fed to the duty ratio table 79, so that duty ratio D for valve 68 is obtained from the table 79. When the depression of the accelerator pedal stops, the transmission ratio changing speed (rate) di/dt becomes negative. Accordingly the value of the duty ratio D becomes larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23 to upshift the transmission. When the actual transmission ratio ia reaches the desired transmission ratio id, the changing speed (rate) di/dt becomes zero, so that the upshifting operation stops.

On the other hand, duty ratio for the valve 66 is reduced, thereby shifting the spool 42 of the valve 40 to the left. The port 41a communicates with the port 41b of the drain passage 27. Thus, line pressure reduces, and the transmission is upshifted to the desired transmission ratio id at the speed di/dt.

As the difference between the desired transmission ratio id and actual transmission ratio ia becomes large and the desired transmission ratio changing speed (rate) becomes large, the duty ratio for the valve 68 becomes large, thereby increasing the shifting speed of the spool 52 to increase the actual transmission ratio changing speed (rate). When the opening degree of the throttle valve is reduced for deceleration, the duty ratio is reduced, thereby shifting the spool 52 to the right to drain the chamber 9. Thus, the transmission is downshifted. The transmission changing speed (rate) at dow-shifting increases with reducing of the duty ratio.

During the operation, when the accelerator pedal is rapidly depressed, the desired transmission ratio id is set to a large value in accordance with the opening degree $\theta$ and speed $N_s$ of the driven pulley. If the actual transmission ratio ia has been constant, the actual transmission ratio changing speed (rate) dia/dt is zero. Therefore, the reduction value idr (FIG. 5a) is also zero so that the corrected desired transmission ratio id$_l$ is the same as the original desired transmission ratio id. Accordingly, the transmission ratio control is practiced in the above manner as shown by the solid line in FIG. 6.

Figure 4:
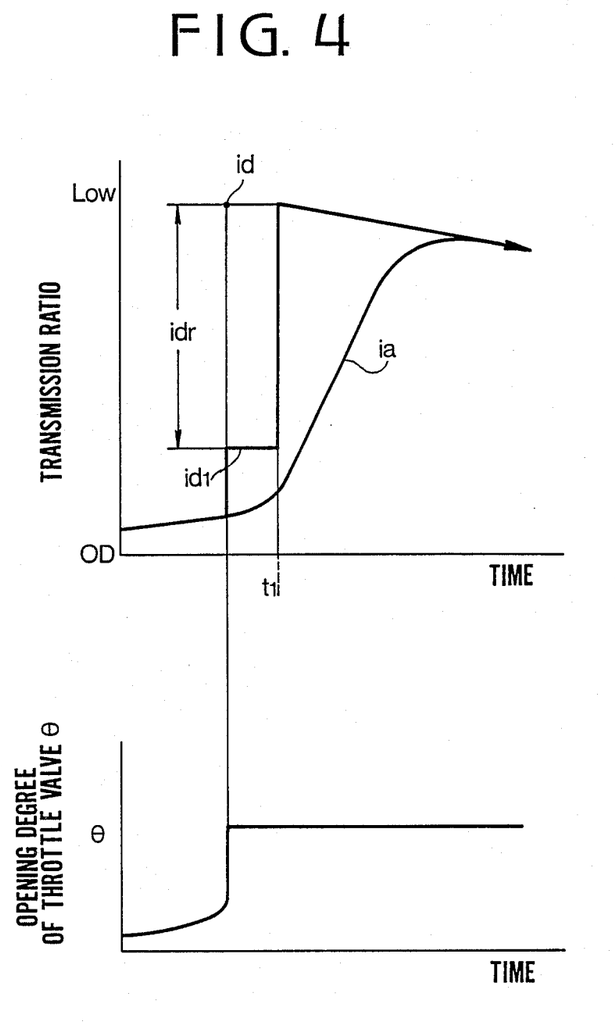
FIG. 4 is a graph showing transmission ratio changing modes.

The operation when the accelerator pedal is further depressed while the transmission ratio is changing is hereinafter described with reference to FIG. 4. Since the transmission ratio is gradually changing at the rapid depression of the accelerator pedal, the desired transmission id is corrected at the correcting section 86. The reduction value idr, which is calculated in the calculator 85 in accordance with the actual transmission ratio changing speed (rate) dia/dt, is subtracted from the value of the desired transmission ratio id to obtain a corrected desired transmission ratio id$_1$. Accordingly, the desired transmission ratio id is decreased. After a predetermined time t$_1$, the desired transmission ratio id$_1$ returns to the original desired transmission ratio id. Thus, the transmission ratio changing speed (rate) di/dt is temporarily decreased so that the actual transmission ratio ia is gradually increased s shown in FIG. 4.

Figure 5B:
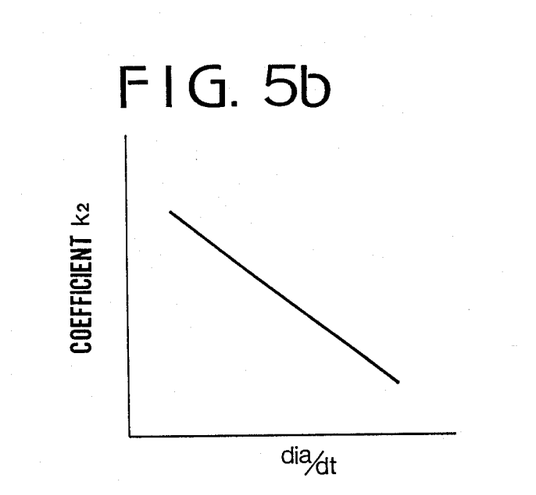
FIG. 5b is a graph showing a relationship between actual transmission ratio changing speed and coefficient K2.

The present invention may be modified so as to decrease the transmission ratio changing speed (rate) di/dt by changing the coefficient K2 instead of the reduction value idr. As shown in FIG. 5b, the coefficient K2 is set as a decreasing function of the actual transmission ratio (rate) changing speed dia/dt.

From the foregoing it will be understood that the present invention provides a transmission ratio control system where transmission ratio is smoothly changed at any running condition of the belt without causing a shock.

While the presently preferred embodiment o the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting power of an internal combustion engine controlled by an accelerator pedal, the transmission comprising a drive pulley having a hydraulically shiftable first disc and a first hydraulic cylinder for operating the disc, a driven pulley having a hydraulically shiftable second disc and a second hydraulic cylinder for operating the second disc, and a belt engaged with both pulleys, the control system including a first hydraulic circuit having a pump for supplying oil to both of the hydraulic cylinders, a transmission ratio control valve having a spool for controlling the oil supplied to the first hydraulic cylinder of the drive pulley, shifting means for shifting the spool, sensing means for sensing operating conditions of the engine and the transmission, actual transmission ratio producing means responsive to the sensed operating conditions for producing means responsive to the sensed signal representing the actual transmission ratio of the transmission, desired transmission ratio producing means responsive to the sensed operating conditions for producing a desired transmission ratio signal representing a value of a desired transmission ratio dependent on the operating conditions, transmission ratio changing rate producing means responsive to the actual transmission ratio signal and the desired transmission ratio signal for producing a transmission ratio changing rate signal, and control signal producing means responsive to the transmission ratio changing rat signal for producing a control signal for operating the shafting means to shift the spool at a speed dependent on the transmission ratio changing rate signal to provide a transmission ratio of the transmission, the improvement in the control system comprising rapid depression detecting means for detecting rapid depression of the accelerator pedal for producing a rapid depression signal, actual transmission ratio changing rate producing means responsive to the actual transmission ratio signal for producing an actual transmission ratio changing rate signal dependent on the actual transmission ratio changing rate, reducing value producing means responsive to the rapid depression signal and the actual transmission ratio changing rate signal for producing a reducing value signal, said reducing value signal being an increasing function of the actual transmission ratio changing rate, correcting means responsive to the reducing value signal for reducing said value of said desired transmission ratio for a predetermined period to produce a correct desired transmission ratio signal, and said transmission ratio changing rate producing means being responsive to the actual transmission ratio signal and to said corrected desired transmission ratio signal for producing a transmission ratio changing rate signal to control the shifting means so as to prevent shock due to a large change of torque at rapid acceleration.

2. The control system according to claim 1 wherein said transmission ratio control valve has chambers at both ends of the spool, the shifting means includes a second hydraulic circuit for supplying oil to the chambers, and control valve means provided in the second hydraulic circuit so as to control flow rate of oil to at least one of the chambers in response to the control signal.

3. The control system according to claim 2 wherein the second hydraulic circuit is provided with a regulator valve for maintaining the pressure of oil at a constant value.

4. The control system according to claim 1 wherein said reducing value signal is substantially a linearly increasing function of the actual transmission ratio changing rate.

5. The control system according to claim 1 wherein said correcting means produces said corrected desired transmission ratio signal by subtracting said reducing value signal from said value of said desired transmission ratio.

6. The control system according to claim 1 wherein said transmission ratio changing rate producing mean produces said transmission ratio changing rate signal by subtracting said actual transmission ratio signal from said corrected desired transmission ratio signal.

7. The control system according to claim 1 wherein said transmission ratio changing rate producing means produces said transmission ratio changing rate signal by subtracting said actual transmission ratio signal from said corrected desired transmission ratio signal and multiplying the result by a first coefficient and adding the result to the product of another coefficient and the rate of change of the corrected desired transmission ratio signal.

8. The control system according to claim 7 further comprising desired transmission ratio changing rate producing means responsive to said correcting means for producing said rate of change of the corrected desired transmission ratio signal for said transmission ratio changing rate producing means.

9. In a control system for a continuously variable transmission for transmitting power of an internal combustion engine controlled by an accelerator pedal, the transmission comprising a drive pulley having a hydraulically shiftable first disc and a first hydraulic cylinder for operating the disc, a driven pulley having a hydraulically shiftable second disc and a second hydraulic cylinder for operating the second disc, and a belt engaged with both pulleys, the control system including a first hydraulic circuit having a pump for supplying oil to both of the hydraulic cylinders, a transmission ratio control valve having a spool for controlling the oil supplied to the first hydraulic cylinder of the drive pulley, shifting means for shifting the spool, sensing means for sensing operating conditions of the engine and the transmission, actual transmission ratio producing means responsive to the sensed operating conditions for producing an actual transmission ratio signal representing the actual transmission ratio of the transmission, desired transmission ratio producing means responsive to the sensed operating conditions for producing a desired transmission ratio signal representing a value of a desired transmission ratio dependent on the operating conditions, transmission ratio changing rate producing means responsive to the actual transmission ratio signal and the desired transmission ratio signal for producing a transmission ratio changing rate signal, and control signal producing means responsive to the transmission ratio changing rate signal for producing a control signal for operating the shifting means to shift the spool at a speed dependent on the transmission ratio changing rate signal to provide a transmission ratio of the transmission, the improvement in the control system comprising rapid depression detecting means for detecting rapid depression of the accelerator pedal for producing a rapid depression signal, actual transmission ratio changing rate producing means responsive to the actual transmission ratio signal for producing an actual transmission ratio changing rate signal dependent on the actual transmission ratio changing rate, means responsive to the rapid depression signal and the actual transmission ratio changing rate signal for providing a coefficient as a decreasing function of the actual transmission ratio changing rate, and said transmission ratio changing rate producing means being responsive to the actual transmission ratio signal and to said coefficient, the latter being multiplied by rate of change of the desired transmission ratio signal for producing a transmission ratio changing rate signal to control the shifting means so as to prevent shock due to a large change of torque at rapid acceleration.

10. The control system according to claim 9, wherein said coefficient is substantially a linearly decreasing function of the actual transmission ratio changing rate.

11. The control system according to claim 9, further comprising desired transmission ratio changing rate producing means for producing said rate of change of the desired transmission ratio signal for said transmission ratio changing rate producing means.

* * * * *